US008160925B2

(12) United States Patent
Anand et al.

(10) Patent No.: US 8,160,925 B2
(45) Date of Patent: Apr. 17, 2012

(54) SYSTEM FOR GENERATING A SMART ADVERTISEMENT BASED ON A DYNAMIC FILE AND A CONFIGURATION FILE

(75) Inventors: Shubhasheesh Anand, Mountain View, CA (US); Majid Mohazzab, Saratoga, CA (US); Lawrence Edward Morrisroe, San Jose, CA (US); M. S. Kiumarse Zamanian, Hillsborough, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1031 days.

(21) Appl. No.: 11/638,314

(22) Filed: Dec. 12, 2006

(65) Prior Publication Data

US 2008/0140524 A1    Jun. 12, 2008

(51) Int. Cl.
*G06Q 30/00* (2012.01)
(52) U.S. Cl. ............... 705/14.49; 705/14.67; 705/14.72; 705/14.73
(58) Field of Classification Search .................. None
See application file for complete search history.

(56) References Cited

U.S. PATENT DOCUMENTS

| | | | |
|---|---|---|---|
| 6,009,410 A * | 12/1999 | LeMole et al. | 705/14 |
| 6,385,592 B1 | 5/2002 | Angles et al. | 705/14 |
| 6,654,725 B1 | 11/2003 | Langheinrich et al. | 705/14 |
| 6,895,387 B1 * | 5/2005 | Roberts et al. | 705/14 |
| 6,925,441 B1 | 8/2005 | Jones, III et al. | 705/10 |
| 2006/0238547 A1 | 10/2006 | Spencer et al. | 345/619 |
| 2006/0282314 A1 | 12/2006 | Zamanian et al. | 705/14 |
| 2007/0055748 A1 * | 3/2007 | Kim et al. | 709/219 |
| 2007/0061195 A1 | 3/2007 | Liu et al. | 705/14 |
| 2007/0157227 A1 | 7/2007 | Carpenter et al. | 725/32 |
| 2008/0004956 A1 | 1/2008 | Atherton et al. | 705/14 |

OTHER PUBLICATIONS

Ars technica, "Microsoft patents the mother of all adware systems," pp. 1-2 at: http://arstechnica.com/news.ars/post/20070717-microsoft-patents-the-mother-of-all-adware-systems.html (last visited Aug. 1, 2007).
Dave Taylor, "*Ask Dave Taylor*" http://www.askdavetaylor.com/what_is_the_amazon_omakase_links_program.html, 6 pages, posted on or before Aug. 2, 2006.
PCT International Search Report of International Application No. PCT/US2007/078134 dated Jan. 10, 2008.
PCT International Preliminary Report and Written Opinion for International Application No. PCT/US2007/078134 mailed Jun. 25, 2009.

* cited by examiner

*Primary Examiner* — John Van Bramer
*Assistant Examiner* — Stacie Gatling
(74) *Attorney, Agent, or Firm* — Nathan O. Greene; Brinks Hofer Gilson & Lione

(57) ABSTRACT

A system is described for generating smart advertisements based on a dynamic file and a configuration file over a network. The smart advertisements may adapt to a specific user profile information and available advertising campaign information. The system may select a deal associated with a smart advertisement campaign based on user profile data and create a dynamic file containing specific information related to the deal. The configuration file may contain advertiser specific graphical information to create a tailored and uniform look and feel for each smart advertisement generated for a particular advertiser. The system may select an appropriate graphical template relating to the smart advertisement campaign and create the smart advertisement by applying the dynamic file and the configuration file to the graphical template to create an advertisement tailored to both the user and the advertiser.

29 Claims, 15 Drawing Sheets

SYSTEM FOR GENERATING A SMART ADVERTISEMENT BASED ON A DYNAMIC FILE AND A CONFIGURATION FILE

BACKGROUND OF THE INVENTION

1. Technical Field

The disclosed embodiments relate to a data processing system for generating smart advertisements based on a dynamic file and a configuration file over a network.

2. Related Art

Online advertising may be used by advertisers to accomplish various business goals, ranging from building brand awareness among potential customers to facilitating online purchases of goods and services. Online advertising, however, differs from traditional forms of advertising because the target of the advertising effort is a user who is actively engaged in the interactive medium in which the advertising content is presented. The medium makes it difficult for advertisers to direct advertisements to individual users that fall, or may potentially fall, within the advertiser's target market. To compensate, advertisers often launch advertising campaigns intended to attract the greatest number of users by employing such methods as broadening their target market, generalizing advertisements to encompass as many users as possible, and expending money to increase the exposure of the advertisements. These efforts, however, are inefficient.

SUMMARY

By way of introduction, the embodiments described below include a system for generating smart advertisements based on a dynamic file and a configuration file over a network. The embodiments relate to selecting and applying the appropriate dynamic file and configuration file to a graphical template to generate the smart advertisements.

In a first aspect, a method is disclosed for generating a smart advertisement, including: selecting one or more deals associated with a smart advertisement campaign based on user profile data, creating a dynamic file containing information related to the one or more deals, identifying a configuration file corresponding to the smart advertisement campaign, and applying the dynamic file and the configuration file to a graphical template to generate a smart advertisement.

In a second aspect, a system is disclosed for generating a smart advertisement, including: a deal server operable to select one or more deals provided by an advertiser based on user profile data and return a dynamic file containing information related to the one or more deals, and a graphics program operable to select a configuration file corresponding to the advertiser and apply the dynamic file and the configuration file to a graphical template to generate a smart advertisement.

In a third aspect, a system is disclosed for generating a smart advertisement system, including: means for selecting one or more deals associated with a smart advertisement campaign based on user profile data, means, coupled with the means for selecting, for creating a dynamic file containing information related to the one or more deals, means, coupled with the means for creating, for identifying a configuration file corresponding to the smart advertisement campaign, and means, coupled with the means for identifying, for applying the dynamic file and the configuration file to a graphical template to generate a smart advertisement.

In a fourth aspect, a system is disclosed for generating a smart advertisement, including computer programming logic stored in a memory and executable by a processor coupled with the memory, the computer programming logic including: first logic operative to select one or more deals associated with a smart advertisement campaign based on user profile data, second logic coupled with the first logic and operative to create a dynamic file containing information related to the one or more deals, third logic coupled with the second logic and operative to identify a configuration file corresponding to the smart advertisement campaign, and fourth logic coupled with the third logic and operative to apply the dynamic file and the configuration file to a graphical template to generate a smart advertisement.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
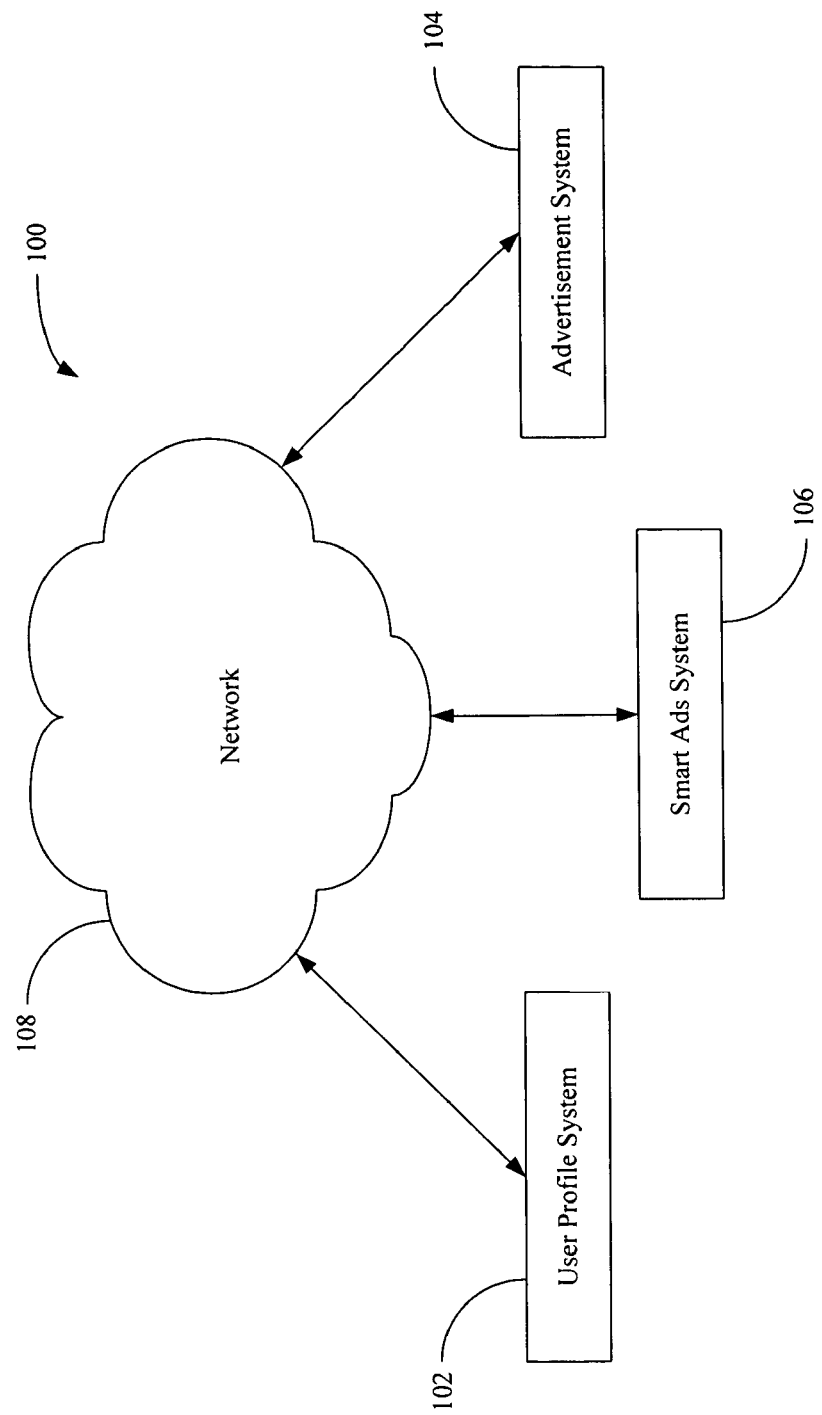
FIG. 1 is a diagram of an exemplary system for generating smart advertisements.

An advertisement generating system 100 for generating smart on-line advertisements ("smart ads") to online users is described. A smart ad is an advertisement capable of automatically and in real-time adapting itself in content and graphics according to a specific online user, based on one or more interests of the user and available smart advertisement campaigns ("ad campaigns") that match or otherwise relate to the user interests. A user interest may refer to anything that may arouse the attention of the user, such as a possession, curiosity, attraction, pastime, desire, etc., or a characteristic or attribute associated with the user. An ad campaign refers to a smart advertisement campaign that is created in the system 100 for an advertiser that wants to target a particular set of users with specific interests. The ad campaigns contain offers, promotions or deals (hereinafter collectively referred to as "deals") that invite a user to perform a desired action, such as click on or proximate to the smart ad, purchase the goods or services being advertised, submit a sales lead, view another web page, download an article or paper, submit user information, register with a web page, or some other desired user action. The system 100 generates the smart ads based on the ad campaigns and deals provided by the advertiser.

Two traditional types of online advertisements are banner advertisements and keyword-based sponsored listing advertisements. A banner advertisement generally features a graphical image and some text that usually takes the form of a horizontal rectangle at the top of a web page, but it can also be arranged in a variety of other shapes at any other predetermined locations on the web page. Sponsored listing advertisements generally are represented by text or textual images and are displayed in a listing based on a user's search criteria or user browser data. For example, if a user enters a search query in a web-based search engine, a set of hyperlinked text listings may be displayed in a predetermined position on the returned page along with the search query results.

The smart ads may require less operational resources to create and manage compared to the traditional types of online advertisements and thus improve the efficiency of online advertising efforts. As will be described below, the smart ads are generated based on a dynamic file for describing and transferring data, e.g., on a network, such as an extensible markup language ("XML"), describing the deals provided by the advertiser, and a predefined graphical template. For explanation purposes, the system 100 is described in terms of an XML, but other formats may be used, such standard generalized markup language ("SGML"). The dynamic XML can change frequently based on the frequency in which the advertisers change or modify the deals, such as on a daily or weekly basis. The graphical templates correspond to particular advertising campaign categories, such as travel, shopping, real estate, mortgage, etc. and may be reused across a broad range of ad campaigns and deals. The advertiser may therefore efficiently provide the user with graphical smart ads based on the most up-to-date deals offered by the advertiser, without having to design or provide specific graphics for each advertisement.

The smart ads may have a higher performance compared to the traditional types of online advertisements and thus improve the performance of online advertising efforts. The smart ads may be generated based on individual user interests and thus an advertiser may target advertising efforts at users that are within a particular market and that in the past have demonstrated a strong interest in the goods or services being advertised. The smart ads may also be generated based on logged performance metrics data and thus the performance rate of the smart ads may be optimized based on various controllable variables and parameters, such as the user's interest profile, ad campaigns, web page placement, time of serving, graphical components of the smart ads, etc. The smart ads may also contain detailed information about specific goods and/or services based on the user's interests and thus the smart ads may promote brand recognition and may also provide the user with more information regarding the deal being advertised, such as price, goods and/or services information, etc., and thus the user may not have to navigate through several landing pages to find this information.

As will be described, the system 100 utilizes logged user profile data by employing one or more heuristic techniques, such as behavior targeting based on the user's browsing or other navigational activity, search-related activity, declared personal data submitted in a user account registration, or other online engagement or interaction. The system 100 selects an ad campaign to display to the user based on the competing ad campaigns, user profile data, constraints provided by the advertiser or system 100, and performance metrics data based on user interaction with past displayed advertisements. The deal therefore relates to the user's interests and has a high likelihood of resulting in a click or other desired action by the user. In addition, a graphical creative component of the smart ad is created in real-time by feeding the appropriate user interests and applicable values of the selected deal within the ad campaign to the graphical templates. The system 100 passes the specific ad, i.e. a smart ad, to the user's web browser to be displayed to the user.

A diagram of the system 100 for generating smart ads is shown in FIG. 1. The system 100 may be divided into several component systems, including a user profile system 102, an advertisement system 104, and a smarts ads system 106. The user profile system 102 generates user profiles based on the logs of data collected about the user's various online activities. The advertisement system 104 makes available ad campaigns and deals from one or more advertisers. The smarts ads system 106 selects an ad campaign based on the user profiles, available ad campaigns and other considerations, such as performance metrics data described below and associates a deal within the ad campaign with a graphical creative component to generate the smart ad, and sends the smart ad to the user's web browser to be displayed to the user.

The user profile system 102, the advertisement system 104, and the smarts ads system 106 are coupled with a network 108. Herein, the phrase "coupled with" is defined to mean directly connected to or indirectly connected through one or more intermediate components. Such intermediate components may include both hardware and software based components. The network 108 enables the systems to communicate and pass data. The network 108 may include any communication method by which information may travel between computing devices. The network 108 may include one or more of a wireless network, a wired network, a local area network (LAN), a wide area network (WAN), a direct connection such as through a Universal Serial Bus (USB) port, and may include the set of interconnected networks that make up the Internet, intranet, or other communication network.

The components within each of the user profile system 102, the advertisement system 104, and the smarts ads system 106 comprise computing devices of various kinds. The computing devices may include any device that is configured to perform computation and that is capable of sending and receiving data communications by way of one or more wired and/or wireless communication interfaces. For example, the components may comprise one or more processors, which may be implemented in software, hardware, or a combination thereof and that one or more of the processors may be integrated together or further sub-divided into additional discrete components. It will also be appreciated that the system 100 disclosed herein may be implemented in one or more computer programs executing on one or more programmable systems comprising at least one processor and at least one data storage system. Each such program may be implemented in any desired computer language to communicate with a computer system.

Figure 2:
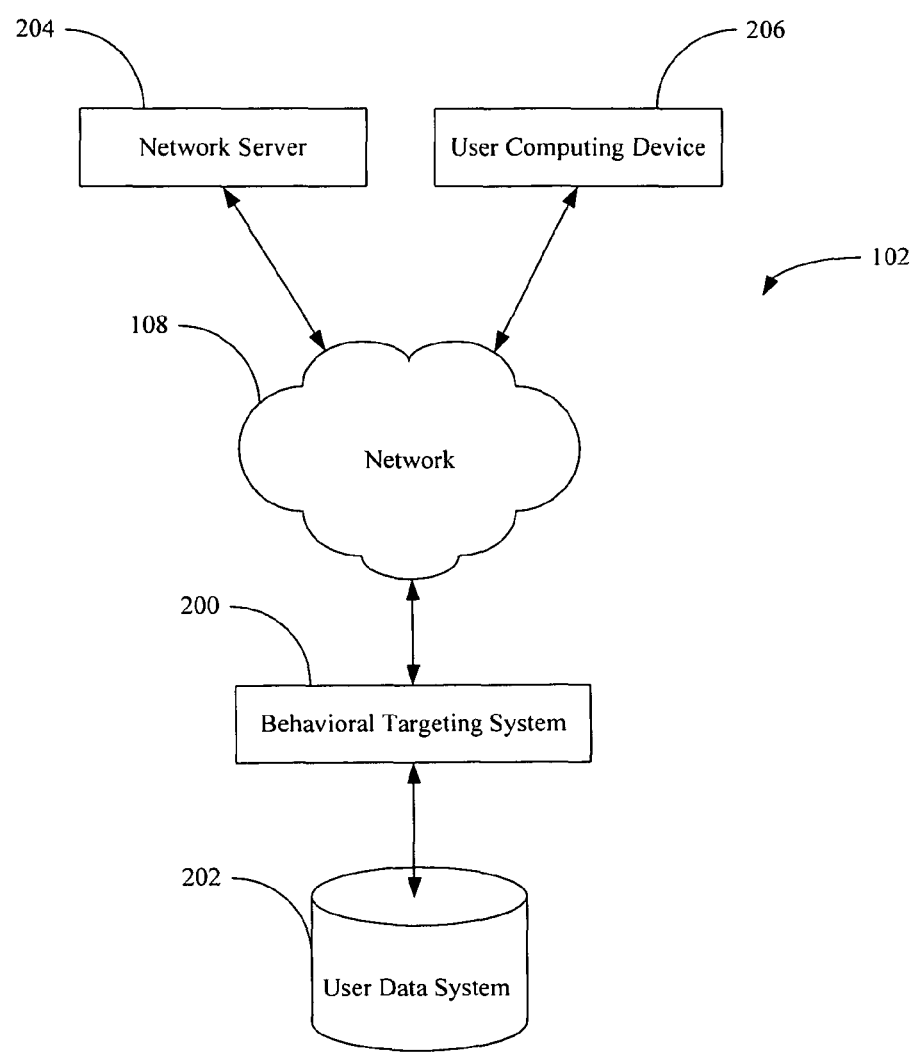
FIG. 2 is a diagram of an exemplary user profile system.

An example of the user profile system 102 is shown in FIG. 2. The user profile system 102 is coupled with the network 108 and is in communication with the smarts ads system 106.

The user profile system 102 includes a behavioral targeting system 200, a user data system ("UDS") 202, one or more network servers 204, and one or more user computing devices 206. As described below, the user profile system 102 employs similar user profiling methods as described in commonly owned U.S. application Ser. No. 11/225,238 entitled "Framework for Selecting and Delivering Advertisements over a Network Based on Combined Short-Term and Long-Term User Behavioral Interests," filed on Sep. 13, 2005, published as U.S. Publication No. 2007/0061195 on Mar. 15, 2007, now abandoned, and incorporated herein by reference.

The behavioral targeting system 200 consumes logs of data compiled for each user based on the user's activity on web pages hosted by the network servers 204 and any information associated with the user's computing device 206. The user activity may be conducting searches, purchasing goods or services, navigating through web pages, clicking on advertisements, logging on to the network, checking weather or maps for a specific location, searching for goods or services, declaring personal information in a user account registration, or other user activity or interaction on the network 108. The information associated with the user's computing device 206 may include user identifying information, such as information gathered from the user's web browser, such as a cookie, the IP address of the host of the user computing device, or other user identifying information, or combinations thereof.

Through the use of various algorithms, mathematical models, statistical formulas, etc., the behavioral targeting system 200 may associate the consumed data with one or more predetermined interest categories and may compute interest scores from the categorized data. The interest categories may be divided at any level of granularity. The interest categories may be broad, generalized categories such as travel, automobiles, finance, games, maps, movies, music, photography, real estate, shopping, sports, and other general areas of interests. The interest categories may also be more specialized categories such as travel to specific destinations, types of automobiles, financing, or games, genres of movies or music, and other specialized areas of interests. The interest scores model the interest levels of users in each of the interest categories. It will be appreciated that the behavioral targeting system 200 may also gather data regarding the user's age, gender, occupation, salary, or other information submitted by the user during a web page registration, if the user is viewing the web page in registered mode.

For example, the behavioral targeting system 200 may compute a high interest score for travel if a user has online activity directed to different destinations other than the user's origin location. The same user may also have another high interest score for golf, a medium interest score for automobiles, and a low interest score for finance. The behavioral targeting system 200 may also compute a high interest score for travel to Las Vegas, Nev., if the user searched for maps of Las Vegas, checked the weather in Las Vegas, or previously purchased airline tickets to Las Vegas. The behavioral targeting system 200 may also determine that the user has a high interest score for travel to Las Vegas during the spring season based on user activities during the spring, a high interest score for a particular hotel in Las Vegas based on previous reservations purchased at the same hotel, or a high interest score for airline tickets below a certain threshold price because the user has purchased airline tickets to Las Vegas only when the price fell below the threshold. In addition, the user profile system 102 may determine that the user lives in San Jose, Calif. based on the user's registration information, IP address, or because the user submitted San Jose as the home location to check the weather. Thus, as will be described below, if an air travel deal exists for a flight from San Jose, Calif. to Las Vegas, Nev., the system 100 may select that particular deal to display as a smart ad to the user.

The UDS 202 is coupled with the behavioral targeting system 200 and stores the various user interest scores and other user profile data according to user identifying information. For example, if the user is registered with a web page operated by the system 100 provider, the data may be organized separately according to a registration ID, if the user is currently logged in. If the user is not registered or logged in, i.e. anonymous, the data may be organized according to cookie information passed from the user's web browser. The user profile data may be stored distinctly based on the user's activities in different modes, i.e., logged in or anonymous, and also used distinctly in the same mode when targeting the user with smart ads for those interests. It will be appreciated that other means of organizing data according to user identifying information may be used by the UDS 202.

The network server 204 is a computing device coupled with the network 108 that holds information, such as web pages, and responds to requests from other computing devices, such as the user computing device 206. The user computing device 206 is coupled with the network 108 and may be any computing device that runs a program operable to communicate with the network server 204, such as a web browser. The user computing device 206 may be a computer, mobile telephone, personal digital assistant (PDA), or other computing device coupled with or otherwise in communication with the network 108. A user may navigate, interact, or communicate with web pages hosted by the network server 204 over the network 108 via the user computing device 206. The communication includes making requests for web pages provided by the network server 204 and may include providing data, such as search query terms or registration profile data.

Figure 3:
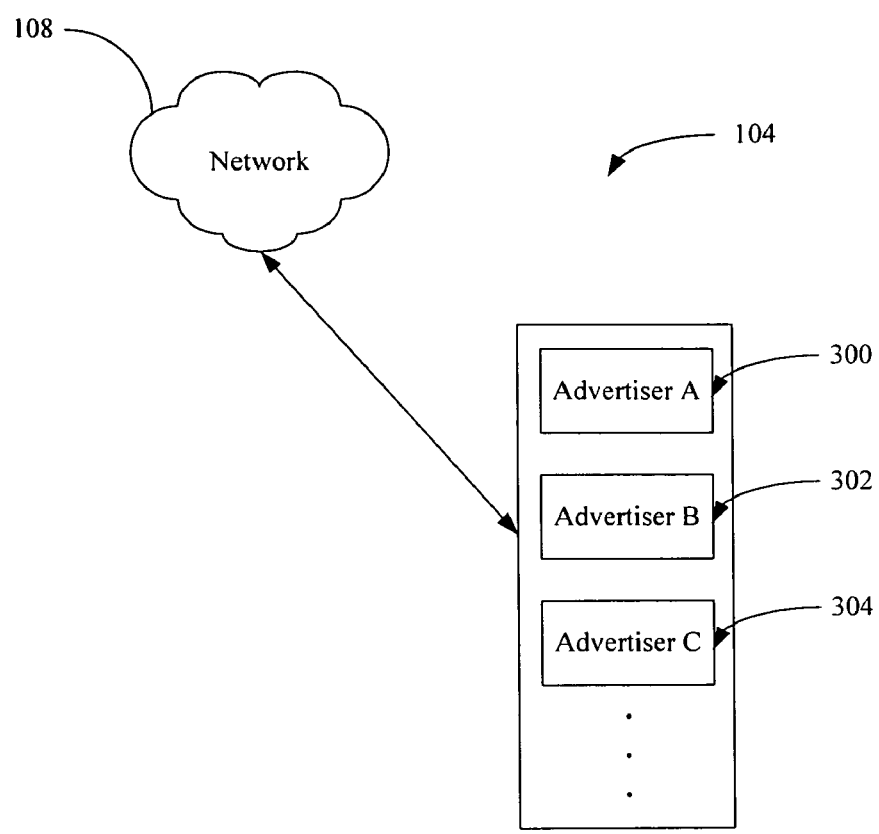
FIG. 3 is a diagram of an exemplary advertisement system.

An example of the advertisement system 104 is shown in FIG. 3. The advertisement system 104 is coupled with the network 108 and is in communication with the smarts ads system 106. The advertisement system 104 is a compilation of one or more advertisers, represented as Advertiser A 300, Advertiser B 302, Advertiser C 304, etc. in FIG. 3, that provide advertising information to the smarts ads system 106. The advertising information may be provided according to a contractual agreement. The contractual agreement may be dependent on the distribution requirements, advertising metrics, and/or pricing mechanisms associated with the smart ads. The contractual agreement may also determine the infrastructure for providing the advertising information, including the type of advertising information, the frequency in which the advertising information is provided, and the methods of transferring the advertising information to the smarts ads system 106. In addition, each advertiser is provided with an advertiser ID, which may be any number, code, or other identifying information that is used by the system 100 to identify each advertiser and its corresponding advertising information.

The advertising information provided by each advertiser contains at least one ad campaign that is established with the smarts ads system 106. It will be appreciated that each ad campaign is associated with a single advertiser, although an advertiser may own multiple ad campaigns within the system 100. The advertisers also provide deals to the smarts ads system 106 that are associated with the ad campaigns. For example, an airline advertiser may create an ad campaign associated with airline travel from San Jose, Calif. to a variety of cities in the southwest region of the United States and provide deals for particular times and prices for flights from San Jose, Calif. to Las Vegas, Nev., Denver, Colo., etc. Similarly, an automobile advertiser may create an ad campaign associated with a new line of trucks and provide deals for particular prices of each model of truck within the new line, or a retail advertiser may create an ad campaign associated with a line of clothing and provide deals for particular prices for articles of clothing within the new line. It will be appreciated that the ad campaigns and deals may cover a wide range of goods or services at any lever of granularity. It will also be appreciated that any number of deals may be associated with a particular ad campaign within the constraints of the system 100.

The advertisers may also provide the smarts ads system 106 with additional advertising information associated with the ad campaigns. For example, the advertiser may provide a description of the advertiser's target market. In one example, the targeting information may be grouped together with user interests gathered by the user profile system 102 to form concepts, i.e. the general idea behind a particular ad campaign. For example, a concept may be a travel interest paired with an airline targeting destination of Las Vegas, Nev., San Francisco, Calif., New York, N.Y., Chicago, Ill., etc. It will be appreciated that any number of concepts may be created at any level of granularity based on the available targeting information and user interests gathered from the user profile data. The advertisers may select concepts as a basis for providing various deals related to the concepts, such as particular times and prices for flights to the above listed destinations.

The advertisers may also provide creative data such as logos, graphics, trademarks, trade dress, audio clips, etc. to be displayed in connection with the smart ads, a desired size or placement for the smart ads on the web page, a budget associated with a particular ad campaign, a timeframe of the ad campaign, etc. The advertiser may also establish a quota or goal to be reached by the ad campaign, such as a desired number of ad campaign impressions, an estimated performance rating expected from the ad campaign, etc. It will be appreciated that the advertisers may also update, modify, and/or replace existing advertising information, or provide new and/or additional advertising information to the smarts ads system 106 at any time. As such, and because ad campaigns are oftentimes short lived due to factors such as being ineffective or market conditions and/or competition in the marketplace, the advertisers, via the system 100, may continuously provide the users with the most up-to-date information regarding the ad campaigns.

The system 100 may employ a number of manual and/or automatic methods to transfer the advertising information from the advertisement system 104 to the smarts ads system 106. In one example, the advertisers manually provide the smarts ads system 106 with ad campaigns, deals, and any other advertising information, which may be manually entered into the smarts ads system 106 under the appropriate advertiser ID. In another example, the advertisers upload the advertising information to the smarts ads system 106 via a self-serve interface. It will be appreciated that the self-serve interface may be particularly useful if the deals are continuously changing and thus need frequent updating. In another example, the smarts ads system 106 automatically downloads the advertising information from a server provided by the advertisers, or other entity. The smarts ads system 106 may download the advertising information daily, weekly, monthly or at any other times designated in the contract or otherwise. It will be appreciated that other methods of transferring the advertising information may be used by the system 100. It will also be appreciated that once the advertising information is provided to the smarts ads system 106, the smarts ads system 106 may use the information to generate smart ads to display to the users.

Figure 4:
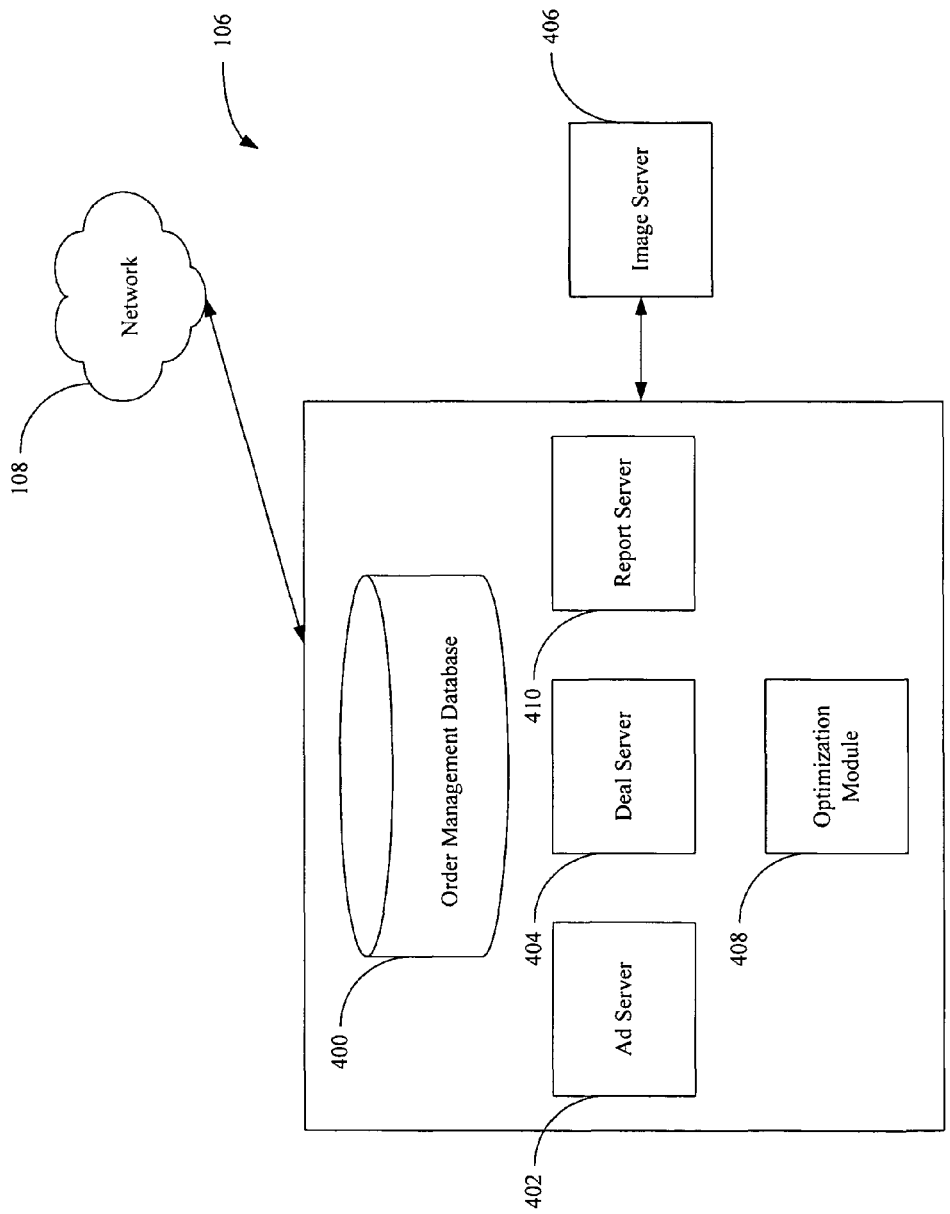
FIG. 4 is a diagram of an exemplary smart ads system.

An example of the smarts ads system 106 is shown in FIG. 4. The smarts ads system 106 is coupled with the network 108 and is in communication with the user profile system 102 and the advertisement system 104. The smarts ads system 106 includes an order management database 400, an advertisement server ("ad server") 402, a deal server 404, an image server 406, an optimization module 408, and a report server 410. The order management database 400 is a collection of advertising information provided by the advertisers that is stored according to the advertiser IDs. The order management database 400 may also store a computer programming code, such as a JavaScript code, in connection with each of the ad campaigns. The JavaScript code facilitates passing data and processing the smart ad over the network 108.

As the user navigates and interacts with web pages over the network 108, the user's web browser sends requests to the web server that is responsible for creating the web page. Oftentimes, the web page will be configured for the inclusion of one or more advertisements to be displayed. If the web page is configured for inclusion of a smart ad, the web server sends a request to the ad server 402 to select a smart ad to be displayed. The web server also sends the ad server 402 the particular placement in which the smart ad is to be displayed and the user identifying information associated with the user's web browser. The user identifying information may be a user registration ID if the user is registered with a web page operated by the system 100 and logged in, or cookie information passed from the user's web browser if the user is not logged in, i.e. anonymous.

The ad server 402 is coupled with the order management database 400 to retrieve the active ad campaigns. The ad server 402 also retrieves the user profile data from the UDS 202 corresponding to the user identifying information passed by the web server. The ad server 402 also identifies the ad campaigns that qualify for the particular placement on the web page. If no ad campaigns qualify for the particular placement, the ad server 402 may select other types of advertisements to display, such as a banner advertisement, sponsored listing advertisement, behavioral targeting advertisement, etc. If a single ad campaign qualifies for the particular placement, the ad server 402 may select the single ad campaign to display as a smart ad to the user at the particular placement.

In the event that multiple ad campaigns qualify for the particular placement, the ad server 402 may employ a variety of metrics, such as the performance status associated with the qualified ad campaigns, user profile data, past performance of similar advertisements, etc., to select a single ad campaign. For example, the ad server 402 may look to the performance status of the ad campaigns to determine whether the ad campaigns are on target to meet the quota or goal established by the system 100 or advertiser, such as a specified number of impressions, clicks, actions, etc, or whether the ad campaigns have exceeded such quota or goal. The ad server 402 may also look to other constraints established by the system 100 or advertiser, such as the budget of an ad campaign, the timeframe specified for a particular ad campaign, the expiration date of the ad campaign, etc, or whether the ad campaign has been booked exclusively for the particular placement. The system 100 may also set a frequency cap such that a particular ad campaign cannot exceed a specified number of impressions within a designated timeframe. The ad server 402 may also look to the user profile data to determine which of the qualified ad campaigns have a target profile that relates to an interest of the user. The ad server 402 may also look to the past performance of similar advertisements determined by the optimization module 408 described below to determine which of the qualified ad campaigns will have the highest likelihood of resulting in a desired action by the user.

In one example, the ad server 402 selects a single ad campaign from multiple qualifying ad campaigns if the ad campaign was booked exclusively for the particular placement, or if the ad campaign is running behind its impressions quota, as compared to the other qualified ad campaigns. If all of the ad campaigns are on target to meet their quota or goal, the ad server 402 may look to the user's profile to select an ad campaign that relates to an interest of the user. The ad server 402 may also look to past performance of similar advertisements. The ad server 402 may send the JavaScript code corresponding to the selected ad campaign to the user's web browser. If the web page is configured for multiple smart ad placements, the ad server 402 may loop through each placement and select the appropriate ad campaign for the particular placement.

In another example, the ad server 402 may look to either the order management database 400 or the deal server 404 to determine whether at least one deal is available for the selected ad campaign. In one example, the ad server 402 sends a request to a campaign qualifying server to determine if a deal is available for the selected ad campaign. For example, the user may have demonstrated an interest in flying from San Jose, Calif. to Las Angeles, Calif.; however, there may be no deals available at that time within the selected ad campaign, assuming the selected ad campaign relates to travel. The ad server 402 may select another ad campaign until a matching deal is found within the ad campaign, or the ad server 402 may select another type of advertisement to display in the particular placement for that user.

After the ad server 402 selects the ad campaign, the ad server 402, in one example, sends the JavaScript code associated with that ad campaign to the user's we browser. The JavaScript code sends a request for a graphics program, such as a Flash program in SWF format, to the image server 406 that is associated with the selected ad campaign. In another example, the ad server 402 returns to the web browser the location of a graphics program stored on the image server 406 that is associated with the selected ad campaign. The web browser may retrieve the graphics program corresponding to the advertising category associated with the selected ad campaign from the appropriate folder on the image server 406. The graphics programs may be stored on the image server 406 in various folders corresponding to various advertising categories, such as air travel, shopping, etc. as described above. Each folder contains graphics programs, graphical templates, and other graphical or audio information associated with the specific advertising categories or advertiser, described more below. In addition, if the advertiser provides additional advertising information, such as logos, trademarks, trade designs, etc., this information may be stored in a folder according to the particular advertiser's advertiser ID.

The image server 406 may be internal or external (as shown) to the smarts ads system 106. If the image server 406 is external to the smarts ads system 106, the image server 406 may be coupled with the smarts ads system 106 via the network 108 or off network. The image server 406 selects a graphics program from the appropriate folder based on the JavaScript code passed for the selected ad campaign, or the location of the graphics program passed from the ad server 402. The graphics program is used to create the graphical component of the smart ads by applying the textual description of attributes associated with the deals to pre-defined graphical templates. The attributes may refer to the name or title of the deal, information relating to the goods or services being advertised, purchasing information, advertiser information, timeframe information, such as the beginning and expiration of the deal or the length of the deal, or other data relating to the deal that may be provided by the advertiser. The graphics program sends a request to the deal server 404 to select the best available deal associated with the ad campaign to be displayed to the user. In another example, the ad server 402 sends the request to the deal server 404 to select the deal.

In one example, the graphics program retrieves user profile data from the UDS 202 based on the user identifying information and passes the data to the deal server 404. In another example, the ad server 402 passes the user profile data to the deal server 404. In another example, the deal server 404 retrieves the user profile data from the UDS 202 based on the user identifying information. The deal server 404 selects available deals associated with the selected ad campaign that relate to an interest of the user based on the user profile data. In one example, the deal server 404 selects available deals stored in the order management database 400 that are associated with the selected ad campaign. In another example, the deals are stored on the deal server 404 and associated with the corresponding ad campaign information stored on the order management database 400. The deal server 404 may select the available deals stored on the deal server 404.

For example, if the selected ad campaign is airline travel and the user is located in San Jose, Calif. and has an interest in Las Vegas, Nev., the deal server 404 may select an air travel deal, if one is available, for a flight from San Jose, Calif. to Las Vegas, Nev. If an available deal matches an interest of the user, the deal server 404 sends a description of the deal to the graphics program. The description of the deal may be in XML format or any other format capable of sending the description of the deal across the network 108. The dynamic XML may change frequently based on the frequency in which the advertisers change or modify the deals, such as on a daily or weekly basis. The dynamic XML may include any number of attributes associated with the deal. The dynamic XML may also include a Uniform Resource Locator (URL) to be associated with the smart ad, which is described below.

The deal server 404 may select multiple deals based on the user profile data and return a dynamic XML containing information relating to each of the multiple deals to the graphics program. The graphics program may decide which data elements to use in the final smart ad construction. For example, multiple fares and times may be returned by the deal server 404 for the air travel deal from San Jose, Calif. to Las Vegas, Nev. The graphics program may show all the fares to improve the performance of the smart ad. For example, each of the different fares may be listed by time, date, and price in the smart ad for display to the user. The different fares may also "pop-up" when the user rolls a cursor over proximate to the location, image, and/or text of the smart ad or portion of the smart ad.

If multiple deals are available within the selected ad campaign, the deal server 404 may select a deal that most relates to the user profile, or has been shown by similarly displayed smart ads to have a high likelihood of resulting in an action by a user of similar profile, which is determined by the optimization module 408 described below. It will be appreciated that the deal server 404 may employ other metrics to select an available deal, relating to the deal price, timing, location, goods or services, etc. If no available deal within the selected ad campaign matches an interest of the user, the deal server 404 may select a generic or default advertisement relating to the ad campaign to display in the particular placement. The deal server 404 may also notify the ad server 402 that no deals were available for the particular user's interests and the ad server 402 may select another ad campaign or another type of advertisement to display in the particular placement for that user.

The optimization module 408 determines the best ad campaign to display to the user that will have the highest likelihood of resulting in a click or other action by the user by manipulating a variety of controllable variables within the constraints associated with each of the available ad campaigns. The available ad campaigns refer to all the ad campaigns that exist within the order management database 400 at any given time. The constraints associated with the ad campaigns may be established by either the advertiser or the system 100 and may include such constraints as the budget associated with the ad campaign, the specified number of impressions to be served, the specified number of clicks or other user actions, the timeframe to satisfy a specified number impressions or performance, the frequency cap established for an ad campaign, etc. The controllable variables are any variables or parameters that may be controlled by the system 100, such as the Cost Per Click ("CPC"), Cost Per Action ("CPA"), the ad campaign, the deal, the types of web pages that the impressions are served on, the placement of the impressions, the timeframe in which the impressions are delivered, the user profiles used to select the impressions, the graphical component associated with the impressions, the size of the impressions, or any other system 100 controllable variables derivable from the log data. It will be appreciated that the comparisons performed by the optimization module 408 will become more complex as the number of variables is increased.

The goal of the optimization module 408 is to maximize the performance rates of the impressions in terms of Click Through Rate ("CTR"), conversion rate, or some other measurable performance rating within the constraints of the ad campaigns. The optimization module 408 consumes log data related to past impressions served, user profile data, and the tracked user interaction with the impressions, such as clicks. From the log data, the optimization module 408 computes and compares the CTR of past impressions or groups of impressions, where the CTR is defined by the number of clicks divided by the number of impressions that were delivered for a particular ad campaign. The optimization module 408 may also compute and compare the conversion rate of past impressions or groups of impressions, where the conversion rate is defined by the number of conversions, i.e. a single user taking a desired action on a web page, divided by the number of impressions that were delivered for a particular ad campaign. The desired action may include purchasing a good or service, submitting a sales lead, viewing another web page, downloading an article or paper, submitting user information, rolling over the advertisement with the cursor, clicking on the advertisement, or some other measurable action. It will be appreciated that the optimization module 408 may similarly compute and compare other measurable performance rates of past impressions or groups of impressions.

The optimization module 408 employs linear optimization to identify the variables from the log data that affect the performance rates of particular ad campaigns and determine mathematical relationships between these variables and the performance rates. Using multivariable mathematical models, the optimization module 408 may express the relationships in terms of numerical values and may create an optimization table that is stored in an efficient in-memory database for quick access by the system 100. An exemplary optimization table may include the following variables: finance related web page (web page type), northeast corner (web page placement), travel (user interest), and female (user gender). It will be appreciated that the table may include any number of variables retrievable from the log data at any level of granularity. The optimization module 408 tracks past ad campaigns that contain these variables and assigns a numerical value to the variables within the optimization table based on the performance rates of the ad campaigns. It will be appreciated that the optimization module 408 may track ad campaigns logged back to any period of time. In one example, the optimization module 408 updates the values in the optimization table daily based on ad campaigns tracked from the previous week.

In the event that multiple ad campaigns qualify for the particular placement, the ad server 402 may look to the optimization table in real time to determine which of the available ad campaigns may have the highest likelihood of resulting in a click or other user action based on the current web page position, user profile, time of day, and other variables that the system 100 may take into consideration, and send the JavaScript code associated with that ad campaign to the user's web browser. Similarly, if multiple deals exist within an ad campaign that match the user's profile, the deal server 404 may look to the optimization table in real time to determine which of the deals may have the highest likelihood of resulting in a click or other user action based on the current user's profile and pass that description of the deal to the graphics program. As will be described below, the graphics program may also look to the optimization table in real time to determine which graphical template and/or other graphical information within the appropriate folders to apply to the particular deal.

The optimization module 408 may also be used as a tool to test the manipulation of certain variables that are determined to perform well under certain conditions to maximize the performance of the ad campaigns within the constraints associated with the ad campaigns. For example,. the placement associated with a particular ad campaign may be changed if the optimization module 408 determines that the ad campaign has a low CTR at that placement. The graphics associated with a particular ad campaign may also be changed if the optimization module 408 determines that the graphics associated with the ad campaign are not performing well. The time of day in which a particular ad campaign is delivered may also be changed if the optimization module 408 determines that the ad campaign has a low CTR at that particular time. The CPC for a particular ad campaign with a low CTR may also be lowered if the optimization module 408 determines that the ad campaign is not competing effectively with other similarly situated ad campaigns. By trial and error, the system 100 may determine which variables to associate with each of the available ad campaigns to maximize the performance rates.

It will be appreciated that the optimization module 408 may utilize any logged data relating to the tracking of user engagement with a smart ad or other online advertisement. The user engagement may refer to seeing the advertisement, clicking on or proximate to the advertisement, purchasing goods or services being advertised, navigating to another web page, such as a landing page, submitting information, downloading information, registering with the web page or service, establishing a business relationship, rolling the cursor over the advertisement, or some other measurable user engagement with the advertisement. It will also be appreciated that the optimization module 408 may also be used by the system 100 to estimate performance based pricing mechanisms. If an advertiser agrees to a CPC or CPA pricing mechanism for an ad campaign, the optimization module 408 may look to past CTR or conversion rates of similar ad campaigns to provide the system 100 a basis for determining the appropriate CPC to charge the advertiser.

After the deal server 404 passes the dynamic XML to the graphics program, the graphics program uses the description to create the graphical component of the smart ad in real time based on predefined graphical templates stored on the image server 406. The graphical templates are graphical backgrounds and/or other graphical or audio data that is displayed in conjunction with the advertisement. The graphical templates are designed to provide quick, efficient, and performance based graphics to display with each ad campaign. The advertiser is therefore not required to expend resources developing graphical information to support each of its ad campaigns. Rather, the system 100 automatically selects the graphical creative template from the appropriate folder on the image server 406 based on, for example, the type of advertisement, applicable values of the selected deal or deals, advertiser information, user profile data, web page placement, particular size of the advertisement, data provided by the optimization tables, etc. The image server 406 stores the graphical templates in appropriate folders corresponding to different classes of advertisements, such as travel, sports, shopping, etc. It will be appreciated that the system 100 and/or the advertisers may update, modify, or replace creative templates at any time.

In addition to the dynamic XML containing the specific information about the deal that will be configured into the smart ad, the graphics program may also reference a configuration XML, which is responsible for making the graphical creative template stored on the image server 406 more specific to the type of smart ad that will be displayed. The configuration XML may construct the overall look and feel of the smart ad. The configuration XML may contain such information as a trademark, trade dress, background image, font style and size, color, or other advertiser branding or advertiser specific information. The smart ads may therefore be generated with the specific fonts, designs, logos, trademarks, etc. of the advertiser. The configuration XML files may be stored on the image server 406 according to the advertiser ID, such that when an ad campaign corresponding to a particular advertiser is selected, the graphics program may retrieve any configuration XML files that may be associated with that advertiser.

As opposed to the dynamic XML which may be deal specific, the configuration XML may be used for multiple deals and ad campaigns associated with a particular advertiser. Separating these two types of information provides additional flexibility and extensibility to change the look and feel of a smart ad independent of the deal information. The smart ads generated from any number of ad campaigns created by a particular advertiser may contain the uniform look and feel that the advertiser may use across all of its advertising efforts. The configuration XML may provide greater opportunity for re-use and customization to meet the advertiser demand. The performance of the smart ad may also be optimized by manipulating the configuration XML. For example, a certain look and feel on one particular website for an airline ad campaign may result in better performance than the same look and feel on another particular website for that airline campaign. The system 100 may therefore optimize the configuration information contained in the configuration XML as well as the specific deal information contained in the dynamic XML. The smart ad may therefore be a high performance graphical advertisement given the type of ad campaign, advertisement information, user profile data, web placement, etc.

The graphics program selects the appropriate graphical template from the image server 406 based on the ad campaign. The graphics program also selects any configuration XML files associated with the advertiser. The graphics program applies the dynamic XML and the configuration XML to the graphical template to generate the smart advertisement. If the deal server 404 returns a dynamic XML containing information related to multiple deals, the graphics program selects which textual attributes from the dynamic XML to apply to the graphical template to generate the smart advertisement. The graphics program sends the smart ad, along with the associated URL, to the particular placement on the user's web browser to be displayed to the user. The URL may be provided by the advertiser to redirect a user that clicks proximate to the location, image, and/or text of the smart ad to a landing page that may provide additional information regarding the advertising goal of the smart ad.

Figure 5:
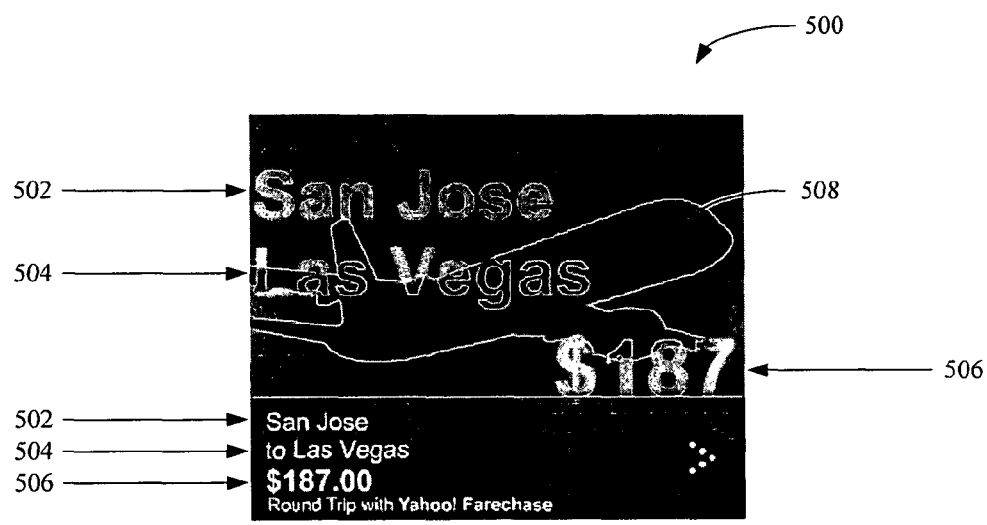
FIG. 5 is an illustration of an exemplary smart advertisement.

An example of a smart ad 500 is shown in FIG. 5. The smart ad 500 relates to an air travel campaign and is created based on the user's city of residence (San Jose, Calif.) 502 and the user's preferred destination (Las Vegas, Nev.) 504, as well as the special airfare deal 506 that the airline is promoting for the specific origin and destination. The graphics program receives the dynamic XML-based description of the deal and selects the appropriate graphical template relating to air travel form the image server 406. To generate smart ad 500, the graphics program applies the textual information from the dynamic XML, i.e. the origin 502, destination 504, and deal price 506, to graphical template 508. The graphical template 508, as shown in FIG. 5, displays an airplane to represent air travel. It will be appreciated that the graphical template may comprise any graphical information related to the selected ad campaign and deals. For example, the graphical template 508 may have displayed clouds and a blue sky in addition to the airplane. It will be appreciated that the graphical templates may include features shown by the optimization module 408 to have high performance rates in connection with particular ad campaigns.

Figure 6:
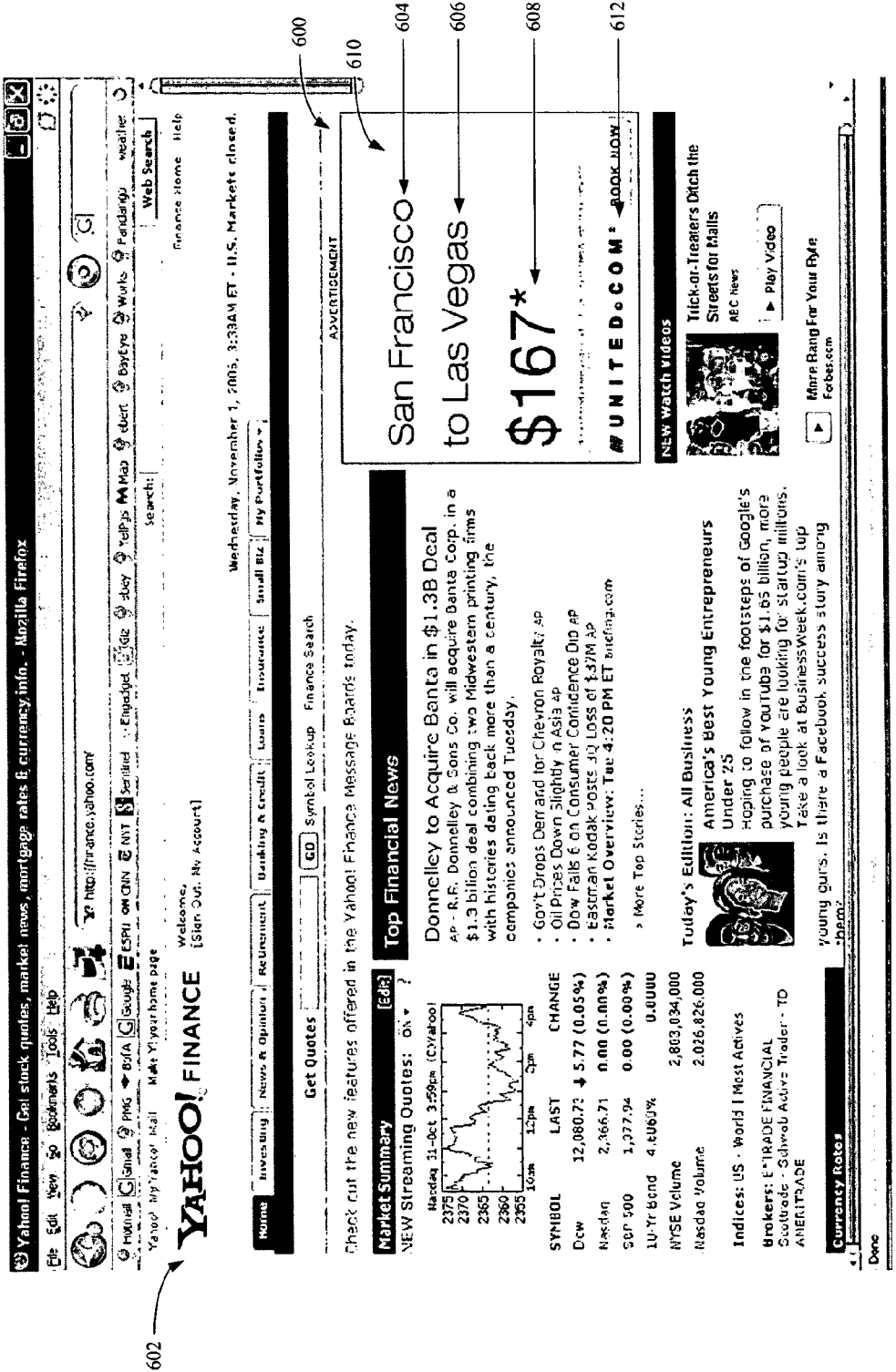
FIG. 6 is an illustration of a web page containing an exemplary smart advertisement.

An example of another smart ad 600 is shown in FIG. 6. The smart ad 600 is displayed on a finance web page 602. The smart ad 600 relates to an air travel campaign provided by United Airlines. The smart ad 600 is targeted at a user that resides in San Francisco, Calif. 604 and has demonstrated an interest in Las Vegas, Nev. 606 via various past online activities, such as search for Las Vegas hotels and airfares, or clicking on travel advertisements for that city. The smart ad 600 also shows the special airfare deal 608 that the airline is promoting for the specific origin and destination. To generate smart ad 600, the graphics program applies the textual information from the dynamic XML, i.e. the origin 604, destination 606, and deal price 608, to graphical template 610. The graphics program also applies a configuration XML graphical template 610. The configuration XML contains a trademark 612 of United Airlines, which may be displayed in conjunction with all United Airlines' smart ads to create a uniform look and feel consistent with its advertising efforts. It will be appreciated that if the user clicks proximate smart ad 600, the user may be directed to a landing page corresponding to the URL that is associated with United Airlines where the user may purchase the ticket for the route displayed.

Figure 7:
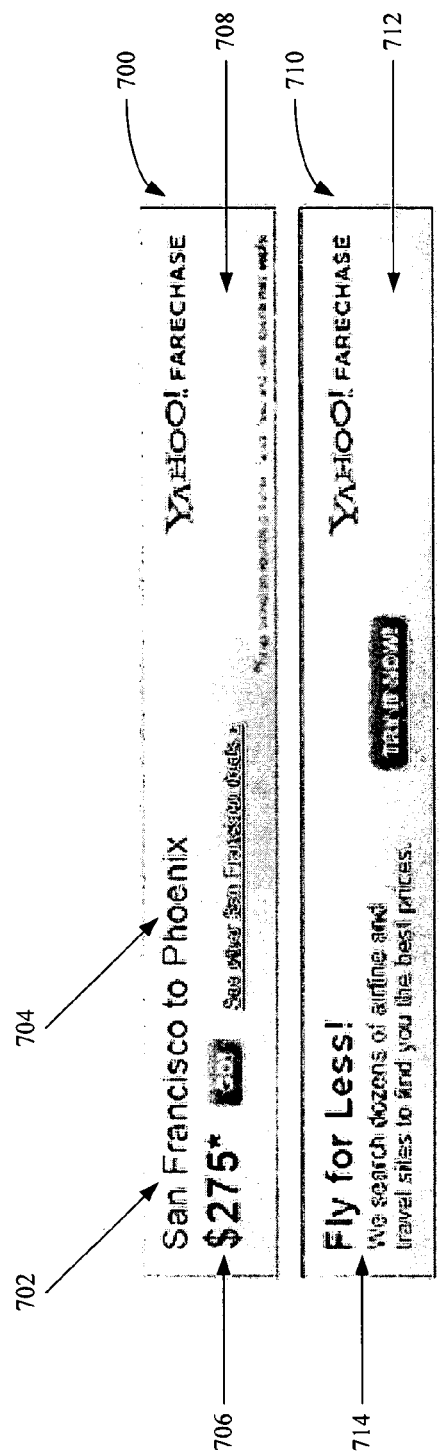
FIG. 7 is an illustration of an exemplary smart advertisement an exemplary default advertisement.

An example of another smart ad 700 is shown in FIG. 7. The smart ad 700 relates to an air travel campaign and is targeted at a user that resides in San Francisco, Calif. 702 and has demonstrated an interest in Phoenix, Ariz. 704 via various past online activities. The smart ad 700 also shows the special airfare deal 706 that the airline is promoting for the specific original and destination. To generate smart ad 700, the graphics program applies the textual information from the dynamic XML, i.e. the origin 702, destination 704, and deal price 706, to graphical template 708. As described above, however, if no available deals exist within the selected ad campaign that match an interest of the user, the deal server 404 may select a default advertisement relating to the ad campaign to display. The default advertisement may also be displayed if the deal server 404 times-out, e.g. if a problem exists with the deal server 404 such that it cannot return a deal within an expected timeframe, e.g. two seconds. In such case, the graphics program may provide a default advertisement 710 based on a generic default creative template 712 to display to the user in the particular web page placement. It will be appreciated that the default advertisement 710 may include any textual information 714 and graphical template 712 as provided by the system 100 or the corresponding advertiser.

The smart ad may also pull in additional information related to the ad campaign, deals, user profile, advertisers, etc. that may make the advertisement more useful to the user. For example, if the ad server 402 selects an ad campaign corresponding to a specific digital camera based on user profile data gathered from online activity directed at a special offers relating to the digital camera, the system 100 may return content to the XML file from user ratings concerning the digital camera to be shown on the smart ad along with the product offer. It will be appreciated that additional information regarding any ad campaign may be gathered and displayed on the smart ad in conjunction with the specific deal or deals to increase the performance and/or usefulness of the smart ad.

As described herein, the delivery of each impression along with the user engagement for the impressions is tracked and logged. From this log data, the report server 410 may generate impression and performance reports at any level of granularity and provide the reports to the advertisers. For example, the report server 410 may generate an impression and performance report based on a single impression within an ad campaign, groups of impressions within an ad campaign, or based on a particular ad campaign. For example, the report server 410 may generate a report comprising all impressions delivered for a specific travel route or for all travel routes for an airline advertising campaign and provide the report to the airline advertiser. The reports may provide a way for the system 100 and the advertisers to monitor the performance of particular ad campaigns. For example, the airline advertiser may compare the success of the airline deal from San Jose, Calif. to Las Vegas, Nev. with another airline deal from San Jose, Calif. to Denver, Colo. or other destinations and adjust the prices, times, flight locations, etc. accordingly.

The reports may also include impression information such as the associated ad campaign, the web page placement, the graphics associated with the impression, and/or other data relating to the impression. From these reports and based on other similar reports, the advertiser may determine whether to pay for different and/or additional placements, or whether to provide the system 100 with additional graphics or other creative data to be displayed with the smart ads to increase the performance of the smart ad. The reports may also include user profile data relating to the users that were served the impressions and may be divided into those users that engaged the advertisement and those users that did not. The advertiser may accordingly increase, decrease, or otherwise alter the target market with respect to the ad campaign. It will be appreciated that the report server 410 may generate and submit reports to the advertisers containing any log data associated with the smart ads, the performance of the smart ads, and the users that are displayed the smart ads. It will also be appreciated that the reports may serve as a billing mechanism to determine the bills for each ad campaign, whether the pricing is based on a Cost Per one thousand (M) impressions (CPM), a CPC or CPA, or some other pricing mechanism.

Figure 8:
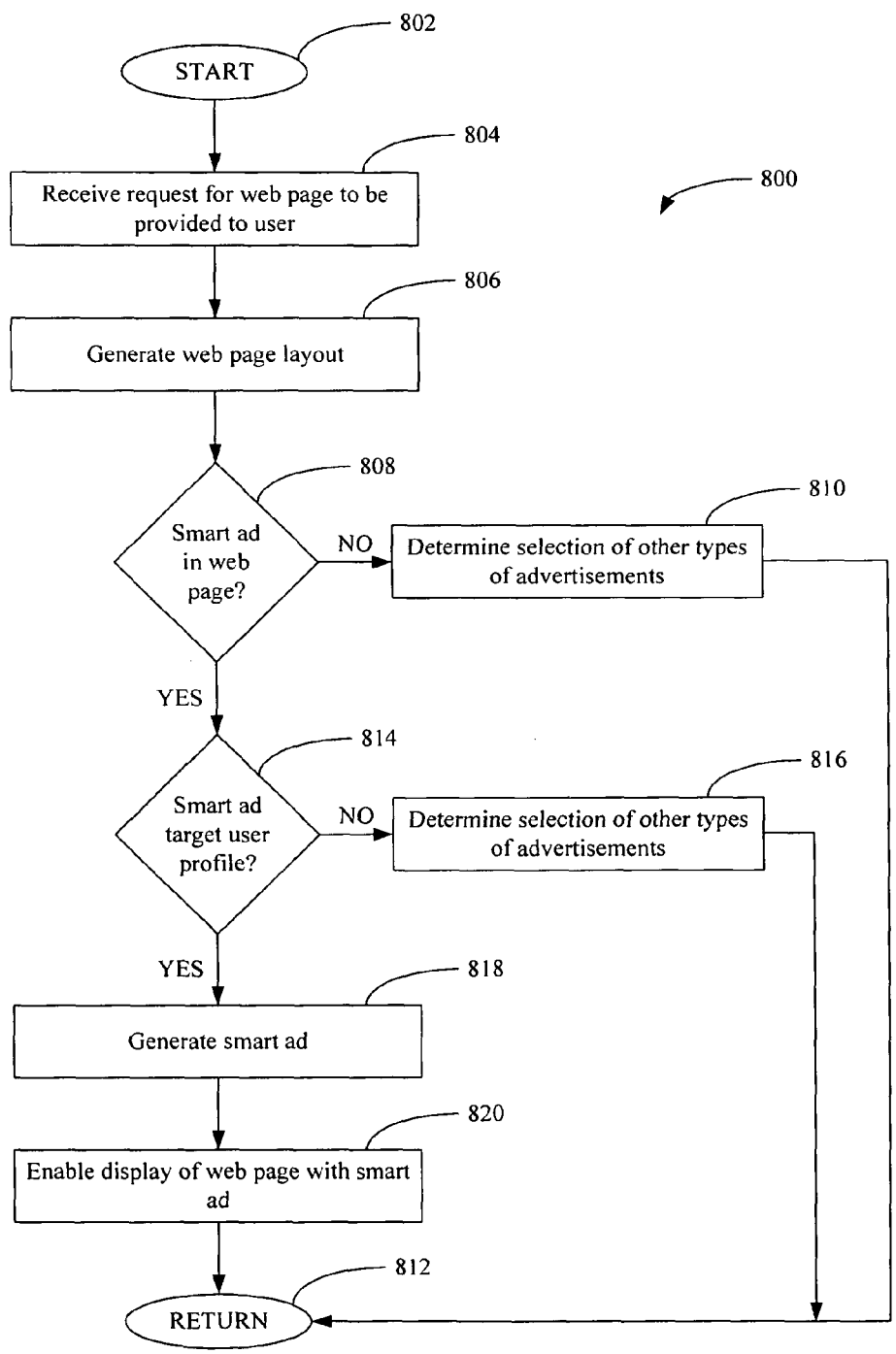
FIG. 8 is a flow diagram illustrating an exemplary process for generating a smart advertisement and enabling the display of a web page containing the smart advertisement.

The operation of certain aspects of the system 100 for generating smart ads to online users will now be described. A flow diagram illustrating an exemplary process 800 for generating a smart ad and enabling the display of a web page containing the smart ad is shown in FIG. 8. Following start block 802, process 800 flows to block 804, where a request for a web page, e.g. a request for a web page from a web browser operated by a user, is received over a network 108, for example, by a web server. Next, at block 806, the page layout and content for the requested web page are generated, for example, by the web server. Process 800 flows to decision block 808, where it is determined whether the page is formatted for the inclusion of a smart ad at a particular location on the web page. If there is no smart ad to be included on the web page, process 800 branches to block 810, where selection of other types of advertisements is determined, and processing flows to return block 812.

If, however, the web page is configured for inclusion of at least one smart ad, process 800 advances to decision block 814, where it is determined whether the smart ad targets the user's profile generated by the user profile system 102. If not, process 800 branches to block 816, where selection of other types of advertisements is determined, and processing flows to return block 812. If, however, a smart ad targets the user's profile, process 800 flows to block 818, where the smart ad is generated. Next, at block 820, the display of the web page with the smart ad at the specified location on the web page is enabled, and processing flows to return block 812.

Figure 9:
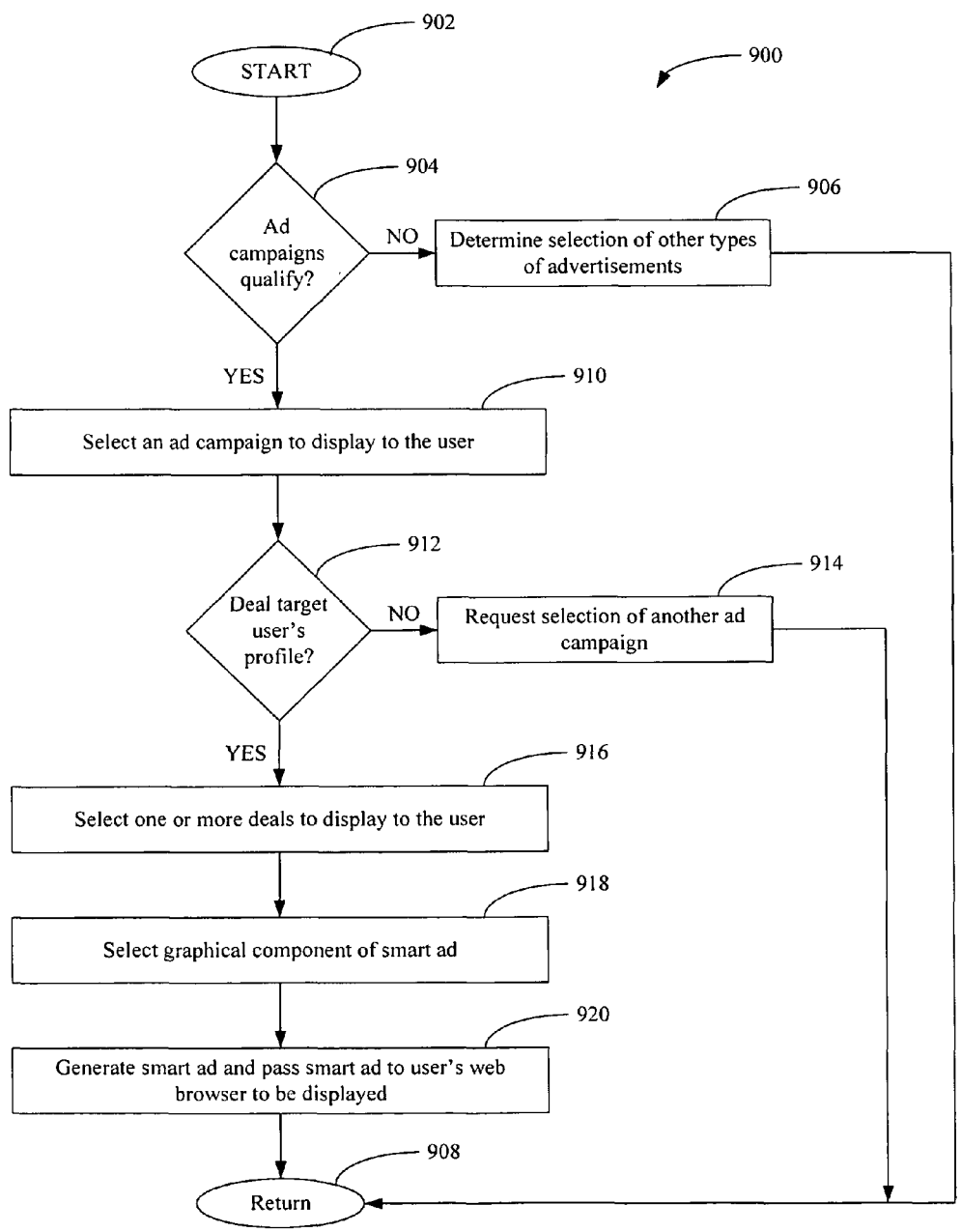
FIG. 9 is a flow diagram illustrating an exemplary process of the smart ads system.

A flow diagram illustrating an exemplary process 900 of the smarts ads system 106 is shown in FIG. 9. It will be appreciated that process 900 occurs after the web page is formatted for the inclusion of one or more smart ads at particular locations on the web page and the web server requests for one or more smart ads to be displayed on the locations. Thus, following start block 902, process 900 flows to decision block 904, where all ad campaigns within the order management database 400 are identified that qualify for the requested placement on the web page. If no ad campaigns qualify, process 900 branches to block 906, where selection of other types of advertisements is determined, and processing flows to return block 908. If, however, at least one ad campaign qualifies, process 900 flows to block 910, where an ad campaign is selected to be displayed to the user.

Process 900 flows to decision block 912, where it is determined if a deal within the selected ad campaigns targets the particular user's profile. If no deals target the user's profile, process 900 branches to block 914, where a request is made to select another ad campaign, and processing flows to return block 908. It will also be appreciated that at block 914, the process 900 may determine the selection of a default advertisement relating to the selected ad campaign. If, however, at least one deal within the selected ad campaign targets the particular user's profile, process 900 flows to block 916, where one or more deals are selected to be displayed to the user based on the user profile data. Process 900 flows to block 918 where the graphical component is selected to be displayed in connection with the selected deal. Process 900 flows to block 920 where the smart ad is generated based on the selected deal and graphical component and the smart ad is passed to the user's web browser to be displayed in the designated placement on the web page. Process 900 flows to the return block 908.

Figure 10:
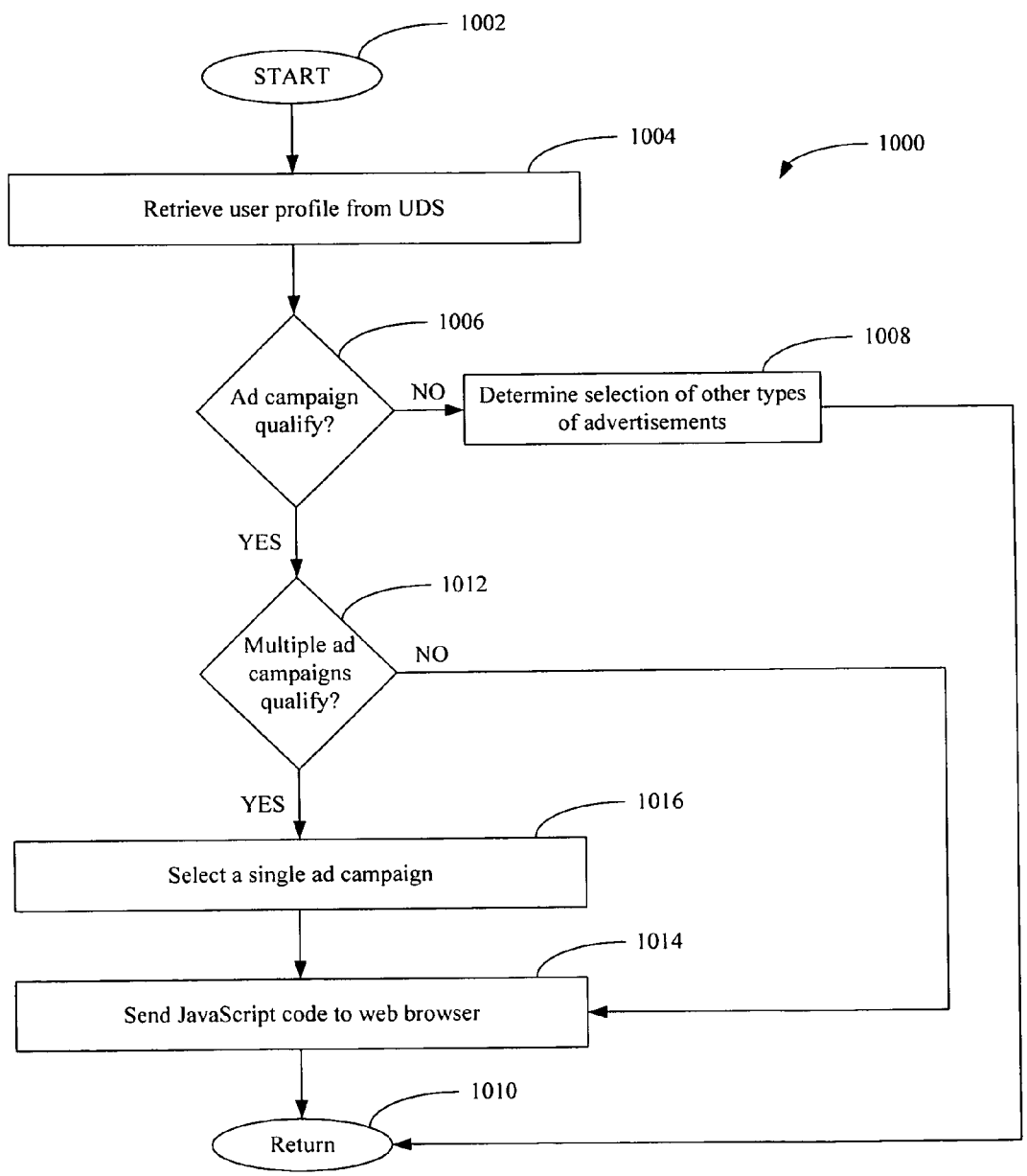
FIG. 10 is a flow diagram illustrating an exemplary process of the advertisement server.

A flow diagram illustrating an exemplary process 1000 of the ad server 402 is shown in FIG. 10. It will be appreciated that process 1000 occurs after the web page is formatted for the inclusion of a smart ad at a particular location on the web page and the web server sends a request to the ad server 402 for a smart ad to be displayed on the location. Thus, following start block 1002, process 1000 flows to block 1004, where the user profile data is retrieved from the UDS 202 based on the user identifying information passed by the web server. Process 1000 flows to decision block 1006, where all ad campaigns within the order management database 400 are identified that qualify for the requested placement on the web page. If no ad campaigns qualify, process 1000 branches to block 1008, where selection of other types of advertisements is determined, and processing flows to return block 1010.

If, however, an ad campaign qualifies for the requested placement, process 1000 flows to decision block 1012, where it is determined if multiple ad campaigns qualify for the particular placement. If not, process 1000 branches to block 1014 where the JavaScript code associated with the single qualifying ad campaign is sent to the user's web browser. If multiple ad campaigns qualify, process 1000 flows to block 1016 where the selections methods described above are employed to select a single ad campaign. Process 1000 flows to block 1014, where the JavaScript code associated with the selected ad campaign is sent to the user's web browser. Process 1000 flows to the return block 1010.

Figure 11:
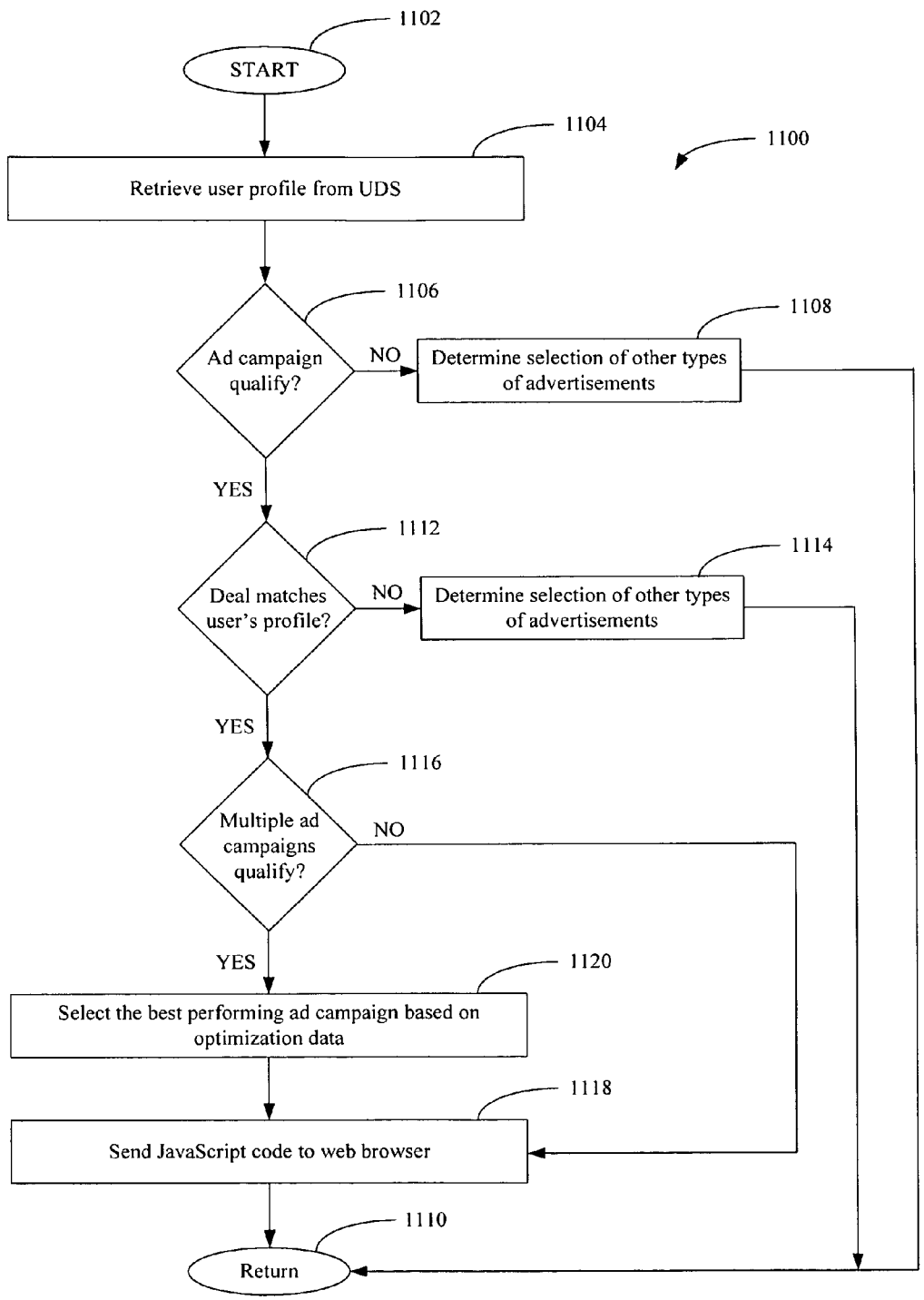
FIG. 11 is a flow diagram illustrating an exemplary process of the advertisement server.

A flow diagram illustrating another exemplary process 1100 of the ad server 402 is shown in FIG. 11. It will be appreciated that process 1100 occurs after the web page is formatted for the inclusion of a smart ad at a particular location on the web page and the web server sends a request to the ad server 402 for a smart ad to be displayed on the location. Thus, following start block 1102, process 1100 flows to block 1104, where the user profile data is retrieved from the UDS 202 based on the user identifying information passed by the web server. Process 1100 flows to decision block 1106, where all ad campaigns within the order management database 400 are identified that qualify for the requested placement on the web page. If no ad campaigns qualify, process 1100 branches to block 1108, where selection of other types of advertisements is determined, and processing flows to return block 1110.

If, however, an ad campaign qualifies for the requested placement, process 1100 flows to decision block 1112, where it is determined whether one or more deals within the qualifying ad campaign are available that match the particular user's profile. If no deals are available, process 1100 branches to block 1114, where selection of other types of advertisements is determined, and processing flows to return block 1110. If, however, one or more deals are available, process 1100 flows to decision block 1116, where it is determined whether one or more deals qualify for multiple ad campaigns. If one or more deals are available for only a single qualifying ad campaign, process 1100 branches to block 1118, where the JavaScript code associated with the single qualifying ad campaign is sent to the user's web browser. If, however, one or more deals qualify for multiple ad campaigns, process 1100 flows to block 1120, where the best performing ad campaign is selected based on the optimization data. Process 1100 flows to block 1118, where the JavaScript code associated with the selected ad campaign is sent to the user's web browser. Process 1100 flows to the return block 1110.

Figure 12:
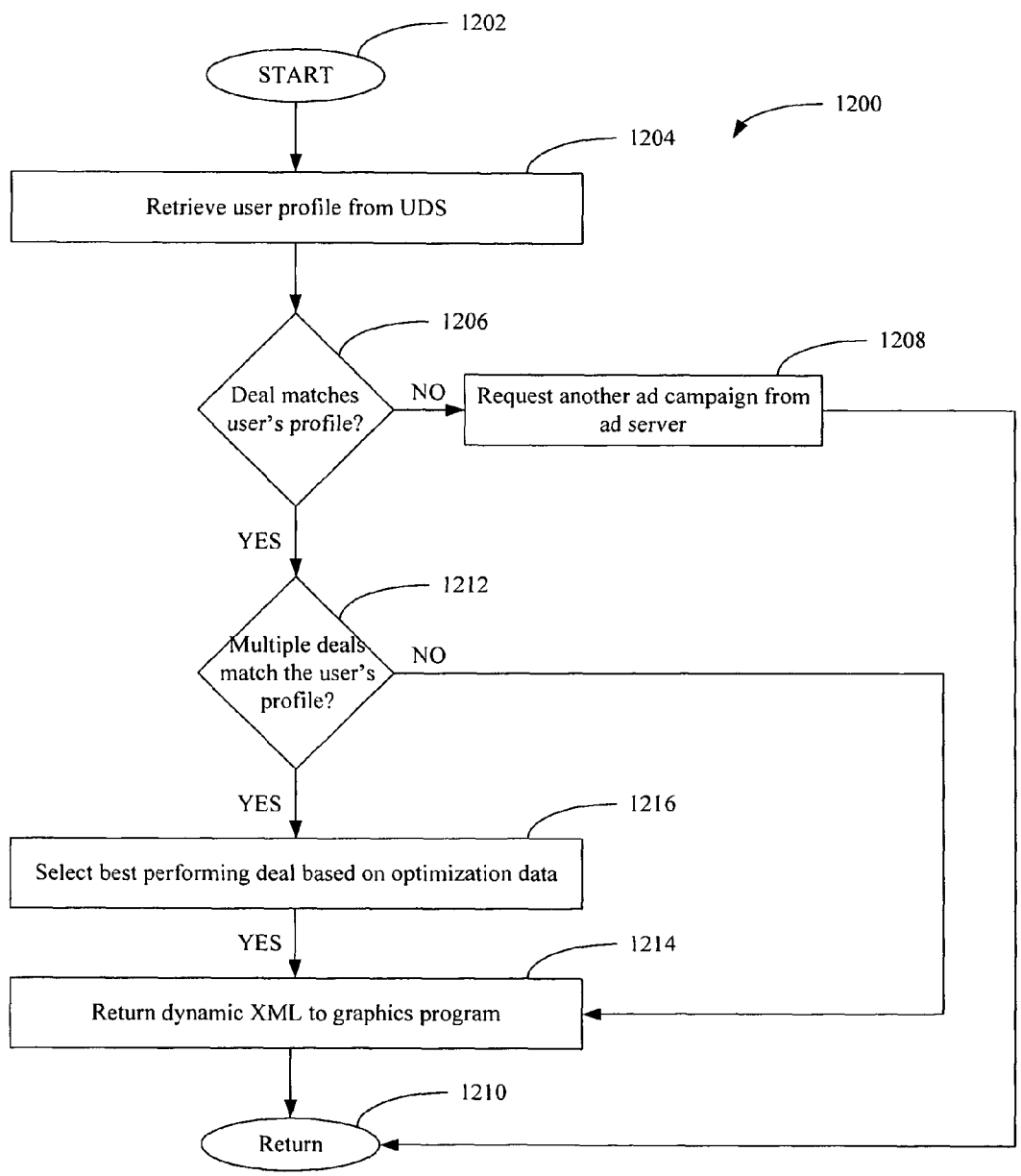
FIG. 12 is a flow diagram illustrating an exemplary process of the deal server.

A flow diagram illustrating an exemplary process 1200 of the deal server 404 is shown in FIG. 12. It will be appreciated that process 1200 occurs after the deal server 404 receives a request to select a deal to display to the user. Thus, following start block 1202, process flows to block 1204, where the user profile data is retrieved based on the user identifying information passed by the web server. Process 1200 flows to decision block 1206, where it is determined if an available deal matches the user's profile. If not, process 1200 branches to block 1208, where a request is sent to the ad server 402 to select another ad campaign, and processing flows to return block 1210. It will be appreciated that at block 1208, the selection of a default advertisement related to the ad campaign may be displayed to the user, and processing flows to return block 1210.

If, however, at least one deal matches the user's profile, process 1200 flows to decision block 1212, where it is determined if multiple deals match the user's profile. If not, process 1200 branches to block 1214, where the dynamic XML-based description of the matching deal is passed to the graphics program. If multiple deals match the user's profile, process 1200 flows to block 1216 where the deal server 404 selects the best performing deal based on the optimization data. Process 1200 flows to block 1214, where the deal server 404 sends the dynamic XML-based description of the best performing deal to the graphics program, and processing flows to return block 1210. It will be appreciated, however, that decision block 1212 may branch directly to block 1214, where the dynamic XML-based description of multiple deals, or some grouping thereof, may be passed to the graphics program.

Figure 13:
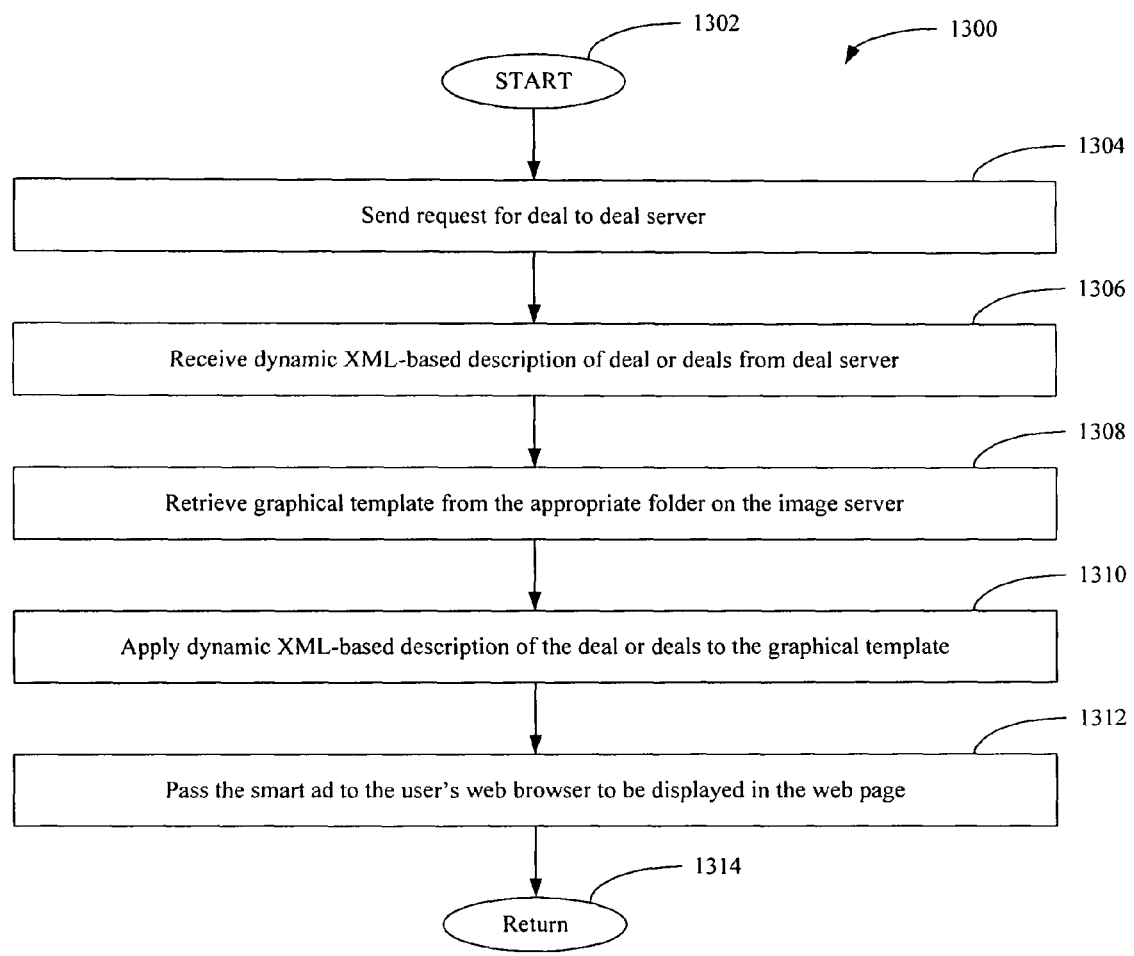
FIG. 13 is a flow diagram illustrating an exemplary process of the graphics program.

A flow diagram illustrating an exemplary process 1300 of the graphics program is shown in FIG. 13. It will be appreciated that process 1300 occurs after the user's web browser retrieves the graphics program for the selected ad campaign from the appropriate folder on the image server 406. Thus, following the start block 1302, process 1300 flows to block 1304, where a request is sent to the deal server 404 to select a deal associated with the ad campaign to be displayed to the user. Process 1300 flows to block 1306, where a dynamic XML-based description of the selected deal or deals is received from the deal server 404. Process 1300 flows to block 1308, where the graphical template is retrieved from the appropriate folder on the image server 406. It will be appreciated that at block 1308, the configuration XML may also be retrieved from the appropriate folder on the image server 406. Process 1300 flows to block 1310, where the XML-based description of the deal or deals (and the configuration XML if applicable) is applied to the graphical template to generate the smart ad. Process 1300 flows to block 1312, where the smart ad is passed to the user's web browser to be displayed in the web page as a smart ad. Process 1300 flows to return block 1314.

Figure 14:
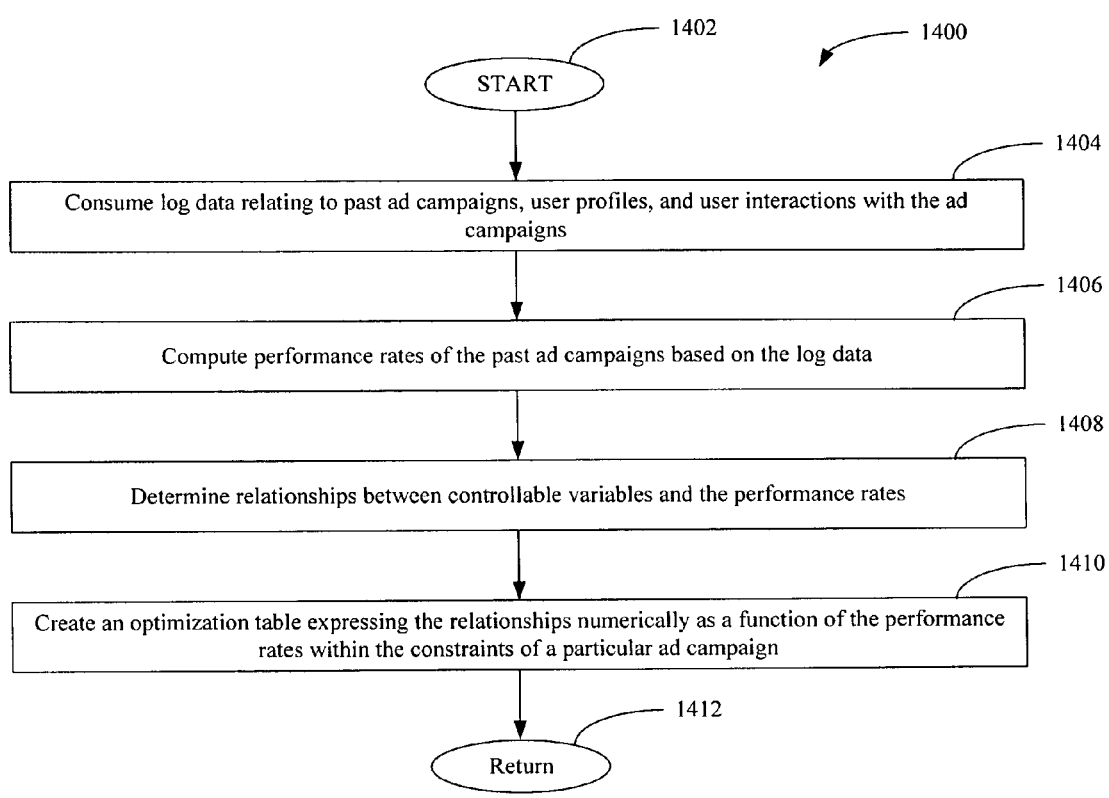
FIG. 14 is a flow diagram illustrating an exemplary process of the optimization module.

A flow diagram illustrating an exemplary process 1400 of the optimization module 408 is shown in FIG. 14. Following start block 1402, process 1400 flows to block 1404, where log data of previously served ad campaigns, profiles of the users served the ad campaigns, and the user interactions with the ad campaigns is consumed. Process 1400 flows to block 1406, where the performance rates, in terms of CTR, conversion rate, or some other measurable performance rating, are computed based on the number of desired performances over the number of impressions served. Process 1400 flows to block 1408, where mathematical relationships are determined between controllable variables and the performance rates. Process 1400 flows to block 1410, where an optimization table expressing the relationships numerically as a function of the performance rates within the constraints of the ad campaign is created. Process 1400 flows to return block 1412. It will be appreciated that the ad server 402, deal server 404, and the graphics program may look to the optimization tables in real time to guide the selection of the ad campaigns, deals, and creative templates, respectively.

Figure 15:
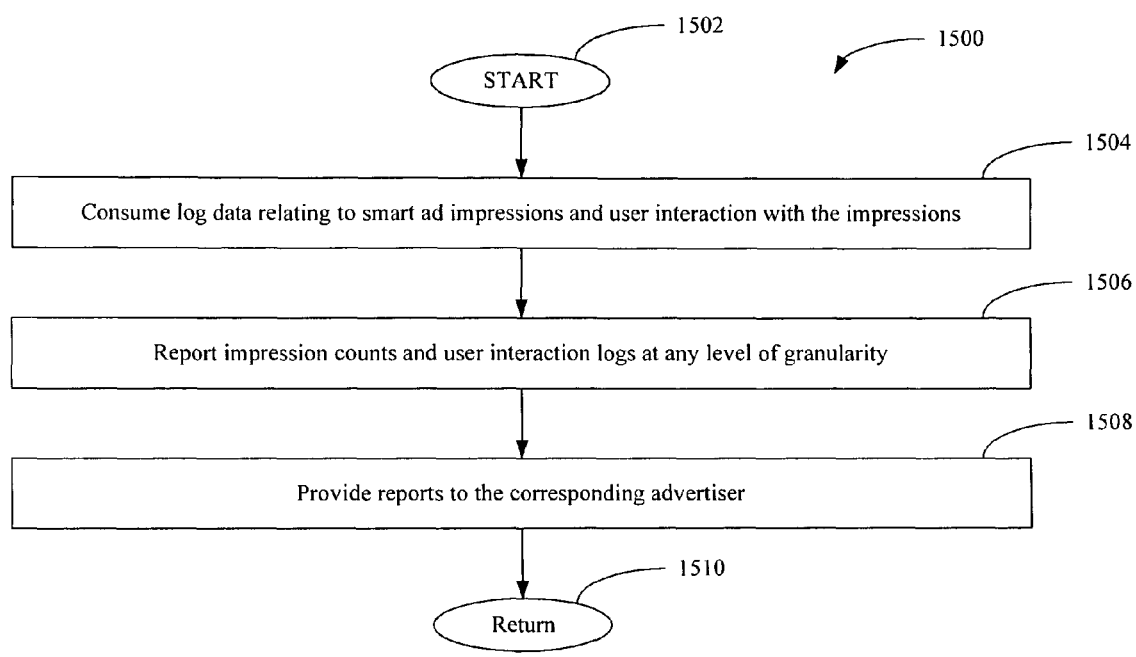
FIG. 15 is a flow diagram illustrating an exemplary processor of the report server.

A flow diagram illustrating an exemplary process 1500 of the report server 410 is shown in FIG. 15. Following start block 1502, process 1500 flows to block 1504, where log data relating to smart ad impressions and user interaction with the impressions is consumed. Process 1500 flows to block 1506, where reports are compiled based on the impression counts and user interaction logs at any level of granularity. Process 1500 flows to block 1508, where the reports may be provided to the corresponding advertiser. Process flows to return block 1510.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A computer implemented method for generating a smart advertisement, comprising:
    selecting, by a processor, one or more deals associated with a smart advertisement campaign based on a user profile data;
    creating, by the processor, a dynamic file comprising of one or more textual attributes describing each of the selected one or more deals;
    identifying, by the processor, a configuration file corresponding to the smart advertisement campaign, wherein the configuration file comprises of a plurality of graphical attributes; and
    generating, by the processor, a smart advertisement by applying the dynamic file and the configuration file to a graphical template, wherein the smart advertisement comprises at least one of the textual attributes of the dynamic file and at least one of the graphical attributes of the configuration file.

2. The method of claim 1 wherein the smart advertisement campaign is created by an advertiser based on targeting information, user interests, and one or more deals.

3. The method of claim 1 wherein the user profile data is obtained based on at least one past activity associated with the user over a network.

4. The method of claim 1 wherein the one or more deals are, continuously updated by an advertiser.

5. The method of claim 1 wherein the one or more textual attributes comprise at least one of a title, an information relating to goods or services, a purchasing information, an advertiser information, an expiration date, or combinations thereof.

6. The method of claim 1 wherein the plurality of graphical attributes comprise at least one of a trademark, a trade dress, a background image, a font style and size, a color, or combinations thereof associated with a particular advertiser.

7. The method of claim 1 wherein the configuration file is stored on a server and associated with a particular advertiser by an advertiser identifier.

8. The method of claim 1 wherein the configuration file corresponds to multiple smart advertisement campaigns associated with a particular advertiser.

9. The method of claim 1 wherein the dynamic file and the configuration file are formatted in an extensible markup language format.

10. A system for generating a smart advertisement, comprising:
    a deal server comprising of a processor, the processor operable to select one or more deals provided by an advertiser based on a user profile data and return a dynamic file comprising of one or more textual attributes describing each of the selected one or more deals; and
    a graphics program stored in a memory and executable by the processor, the graphics program operable to select a configuration file corresponding to the advertiser, the configuration file describing a plurality of modifications to a plurality of graphical attributes of a graphical template, and generate a smart advertisement by applying the textual attributes of the dynamic file and the plurality of modifications of the configuration file to the graphical attributes of the graphical template, wherein the smart advertisement comprises of at least one of the textual attributes.

11. The system of claim 10 wherein the one or more deals are associated with a smart advertisement campaign created by an advertiser.

12. The system of claim 10 wherein the user profile data is obtained based on at least one past activity associated with the user over a network.

13. The system of claim 10 wherein the one or more textual attributes comprise at least one of a title, an information relating goods or services, a purchasing information, an advertiser information, an expiration date, or combinations thereof.

14. The system of claim 10 wherein the deals are updated by the advertiser on frequent basis.

15. The system of claim 10 wherein the graphics program is a Flash program.

16. The system of claim 10 wherein the processor of the deal server returns a dynamic file comprising of one or more textual attributes describing each of the selected one or more deals and wherein the graphics program is operable to select the one or more textual attributes from the dynamic file to apply to the graphical template to generate the smart advertisement.

17. The system of claim 10 wherein the plurality of modifications to the plurality of graphical attributes comprise at least one of a trademark modification, a trade dress modification, a background image modification, a font style and size modification, a color modification, or combinations thereof.

18. The system of claim 17 wherein the configuration file is tailored to a particular advertiser.

19. The system of claim 10 wherein the configuration file is stored on a server and associated with a particular advertiser by an advertiser identifier.

20. The system of claim 10 wherein the configuration file corresponds to multiple smart advertisement campaigns associated with a particular advertiser.

21. The system of claim 10 wherein the dynamic file and the configuration file are formatted in an extensible markup language format.

22. A system for generating a smart advertisement, comprising:
    means for selecting one or more deals associated with a smart advertisement campaign based on a user profile data;
    means, coupled with the means for selecting, for creating a dynamic file comprising of one or more textual attributes describing each of the selected one or more deals;
    means, coupled with the means for creating, for identifying a configuration file corresponding to the smart advertisement campaign, wherein the configuration file comprises of a plurality of graphical attributes; and
    means, coupled with the means for identifying, for generating a smart advertisement by applying the dynamic file and the configuration file to a graphical template, wherein the smart advertisement comprises at least one of the textual attributes of the dynamic file and at least one of the graphical attributes of the configuration file.

23. The system of claim 22 wherein the textual attributes comprise at least one of a title, an information relating to goods or services, an purchasing information, an advertiser information, an expiration date, or combinations thereof.

24. The system of claim 22 wherein the plurality of graphical attributes comprise at least one of a trademark, a trade dress, a background image, a font style and size, a color, or combinations thereof associated with a particular advertiser.

25. The system of claim 22 wherein the dynamic file and the configuration file are formatted in an extensible markup language format.

26. A system for generating a smart advertisement comprising computer programming logic stored in a memory and executable by a processor coupled with the memory, the computer programming logic comprising:

first logic operative to select one or more deals associated with a smart advertisement campaign based on a user profile data;

second logic coupled with the first logic and operative to create a dynamic file comprising of one or more textual attributes describing each of the selected one or more deals;

third logic coupled with the second logic and operative to identify a configuration file corresponding to the smart advertisement campaign, wherein the configuration file comprises of a plurality of graphical attributes; and fourth logic coupled with the third logic and operative to generate a smart advertisement by applying the dynamic file and the configuration file to a graphical template, wherein the smart advertisement comprises at least one of the textual attributes of the dynamic file and at least one of the graphical attributes of the configuration file.

27. The system of claim 26 wherein the textual attributes comprise at least one of a title, information relating to goods or services, purchasing information, advertiser information, expiration date, or combinations thereof.

28. The system of claim 26 wherein the plurality of graphical attributes comprise at least one of a trademark, a trade dress, a background image, a font style and size, a color, or combinations thereof associated with a particular advertiser.

29. The system of claim 26 wherein the dynamic file and the configuration file are formatted in an extensible markup language format.

* * * * *